US012619213B2

(12) United States Patent
Li et al.

(10) Patent No.: US 12,619,213 B2
(45) Date of Patent: May 5, 2026

(54) CONTROLLING METHOD AND DEVICE FOR AN INDUSTRIAL DEVICE

(71) Applicant: Siemens Aktiengesellschaft, Munich (DE)

(72) Inventors: Xiang Li, Beijing (CN); Xiao Feng Wang, Beijing (CN); Fan Bo Meng, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 516 days.

(21) Appl. No.: 18/245,917

(22) PCT Filed: Sep. 21, 2020

(86) PCT No.: PCT/CN2020/116538
§ 371 (c)(1),
(2) Date: Mar. 20, 2023

(87) PCT Pub. No.: WO2022/056916
PCT Pub. Date: Mar. 24, 2022

(65) Prior Publication Data
US 2023/0384764 A1      Nov. 30, 2023

(51) Int. Cl.
*G05B 19/4155* (2006.01)
*G05B 19/4063* (2006.01)

(52) U.S. Cl.
CPC ..... *G05B 19/4155* (2013.01); *G05B 19/4063* (2013.01); *G05B 2219/32334* (2013.01); *G05B 2219/49065* (2013.01)

(58) Field of Classification Search
CPC ........... G05B 13/0265; G05B 19/4063; G05B 19/4155; G05B 2219/32334;
(Continued)

(56) References Cited

U.S. PATENT DOCUMENTS

| | | | |
|---|---|---|---|
| 2020/0050178 A1* | 2/2020 | Gao | G06Q 10/0635 |
| 2020/0065704 A1* | 2/2020 | Nag | G06N 3/006 |
| 2021/0173377 A1* | 6/2021 | Laftchiev | G05B 13/0265 |

FOREIGN PATENT DOCUMENTS

| | | | |
|---|---|---|---|
| CN | 107 272 785 | 10/2017 | G05D 27/02 |
| CN | 110285687 | * 9/2019 | |

(Continued)

OTHER PUBLICATIONS

Search Report for International Application No. PCT/CN2020/116538, 12 pages, Jun. 18, 2021.
(Continued)

*Primary Examiner* — Tameem D Siddiquee
(74) *Attorney, Agent, or Firm* — Slayden Grubert Beard PLLC

(57) ABSTRACT
Various embodiments include methods for controlling an industrial device. Some embodiments include: obtaining a state input characterizing a current state of the industrial device; processing the state input to generate an action output characterizing an expected action to be performed by the industrial device for the current state, based on a machine learning model trained based on states of the industrial device, actions each performed for each state of the industrial device and results each obtained by performing each action; and generating a control signal for the industrial device based on the action output.

12 Claims, 6 Drawing Sheets

100

(58) Field of Classification Search
CPC ........... G05B 2219/49065; G06N 3/09; G06N
3/092; G06Q 10/06
See application file for complete search history.

(56) References Cited

FOREIGN PATENT DOCUMENTS

| | | | |
|----|--------------|---------|--------------|
| CN | 110 326 008 | 10/2019 | ............. G06Q 10/06 |
| CN | 111 460 850 | 7/2020 | ............... G06K 9/00 |
| CN | 111 639 779 | 9/2020 | ............. G06Q 10/04 |
| WO | 2020/123687 A1 | 6/2020 | ............. G05B 13/02 |

OTHER PUBLICATIONS

Extended European Search Report, Application No. 20953774.5, 8
pages, Mar. 15, 2024.

* cited by examiner

100

300

400

10

CONTROLLING METHOD AND DEVICE FOR AN INDUSTRIAL DEVICE

CROSS-REFERENCE TO RELATED APPLICATIONS

This application is a U.S. National Stage Application of International Application No. PCT/CN2020/116538 filed Sep. 21, 2020, which designates the United States of America, the contents of which are hereby incorporated by reference in their entirety.

TECHNICAL FIELD

The present disclosure generally relates to industrial controls. Various embodiments of the teachings herein include machine learning based industrial controls.

BACKGROUND

Currently, most industrial devices are controlled by rules predefined by human experts or controllers tuned by human experts. In order to achieve an automatic control, the control of the industrial devices is generally guided by simplified formulation of expert knowledge. But, for highly non-linear, multi-inputs, multi-outputs and delayed industrial devices, this cannot deliver a satisfying control performance.

For highly non-linear, multi-inputs, multi-outputs and delayed industrial devices, separate controls have been used for different device parameters with multiple control loops, but with multiple loops, the control for the device can become unstable and sensitive to small perturbation. In some situations, an empirical control is introduced for a parameter with a high inert response; but this cannot guarantee a consistent production quality of the industrial devices.

Alternatively, a model predictive control is used for highly non-linear, multi-inputs, multi-outputs and delayed industrial devices. The core idea of the model predictive control is to use a model to predict future plant output and solves an optimization problem to select an optimal control. Designing the model requires high manual work and expert knowledge and real time control is not feasible because to find the optimal solution with the model takes too long to compute.

SUMMARY

Various embodiments of the teachings of the present disclosure include controlling methods and/or devices for an industrial device that use a machine learning model which is trained, based on not only states of the industrial device and actions each performed for each state of the industrial device but also results each obtained by performing each action, to generate an expected action to be performed for a current state of the industrial device. The modelling does not require manual work and thus the industrial device may be controlled with low cost and high time efficiency. For example, some embodiments include a method for controlling an industrial device comprising: obtaining a state input characterizing a current state of the industrial device; processing the state input to generate an action output characterizing an expected action to be performed by the industrial device for the current state, based on a machine learning model that is trained based on states of the industrial device, actions each performed for each state of the industrial device and results each obtained by performing each action; and generating a control signal for the industrial device based on the action output.

In some embodiments, the actions and the results of the industrial device are derived from historical data of the industrial device and/or human expert knowledge.

In some embodiments, the machine learning model is trained via on-policy learning or off-policy learning.

In some embodiments, the machine learning model is generated by training the machine learning model based on the states of the industrial device, the actions each performed for each state of the industrial device and the results each obtained by performing each action.

In some embodiments, the machine learning model is updated by obtaining a further state of the industrial device; processing the further state of the industrial device to generate a further action to be performed by the industrial device for the further state, based on the machine learning model; generating a state next to the further state based on the further state and the further action based on a device model that is trained based on each pair of state and action of the industrial device and a next state corresponding to the pair of the state and the action; computing a result of the further action based on the further state and the state next to the further state; and updating the machine learning model based on the further state, the further action and the result of the further action.

In some embodiments, the device model is updated by obtaining one or more pairs of state and action from historical data of the industrial device; obtaining one or more next states each corresponding to one of the one or more pairs of state and action from the historical data of the industrial device; and updating the device model based on the obtained one or more pairs of state and action and the obtained one or more next states.

In some embodiments, the method further comprises: determining if the expected action can be safely performed by the industrial device; and in response to a determination that the expected action can be safely performed, generating the control signal for the industrial device to perform the expected action, obtaining the result corresponding to the expected action, and updating the machine learning model based on the current state, the expected action and the result corresponding to the expected action.

In some embodiments, the method further comprises, in response to a determination that the expected action cannot be safely performed, updating the machine learning model based on the current state, the expected action and a predetermined result for the current state and the expected action.

As another example, some embodiments include a device for controlling an industrial device comprising: an obtaining apparatus for obtaining a state input characterizing a current state of the industrial device; a processor for processing the state input to generate an action output characterizing an expected action to be performed by the industrial device for the current state, based on a machine learning model that is trained based on states of the industrial device, actions each performed for each state of the industrial device and results each obtained by performing each action, and generating a control signal for the industrial device based on the action output; and a controller for controlling the industrial device based on the control signal.

In some embodiments, the processor is further for updating the machine learning model by: obtaining a further state of the industrial device; processing the further state of the industrial device to generate a further action to be performed by the industrial device for the further state, based on the machine learning model; generating a state next to the further state based on the further state and the further action based on a device model that is trained based on each pair of state and action of the industrial device and a next state corresponding to the pair of the state and the action; computing a result of the further action based on the further state and the state next to the further state; and updating the machine learning model based on the further state, the further action and the result of the further action.

In some embodiments, the processor is further for updating the device model by: obtaining one or more pairs of state and action from historical data of the industrial device; obtaining one or more next states each corresponding to one of the one or more pairs of state and action from the historical data of the industrial device; and updating the device model based on the obtained one or more pairs of state and action and the obtained one or more next states.

In some embodiments, the processor is further programmed to determining if the expected action can be safely performed by the industrial device; and in response to a determination that the expected action can be safely performed, generating the control signal for the industrial device to perform the expected action, obtaining the result corresponding to the expected action, and updating the machine learning model based on the current state, the expected action and the result corresponding to the expected action.

In some embodiments, the processor is further programmed to, in response to a determination that the expected action cannot be safely performed, updating the machine learning model based on the current state, the expected action and a predetermined result for the current state and the expected action.

As another example, some embodiments include a controlling device for an industrial device comprising: one or more processor; and one or more memories storing instructions that are operable, when executed the one or more processor, to cause the one or more processor to perform one or more of the methods described herein.

As another example, some embodiments include a computer storage medium comprising instructions for, when executed by one or more processors, performing the steps of one or more of the methods as described herein.

BRIEF DESCRIPTION OF THE DRAWINGS

Various aspects and features of the disclosure are described in further detail below. And other objects and advantages of the teachings of the present disclosure will become more apparent and will be easily understood with reference to the description made in combination with the accompanying drawings. The teachings of the present disclosure are described and explained hereinafter in more detail in combination with embodiments and with reference to the drawings, wherein.

DETAILED DESCRIPTION

Figure 1:
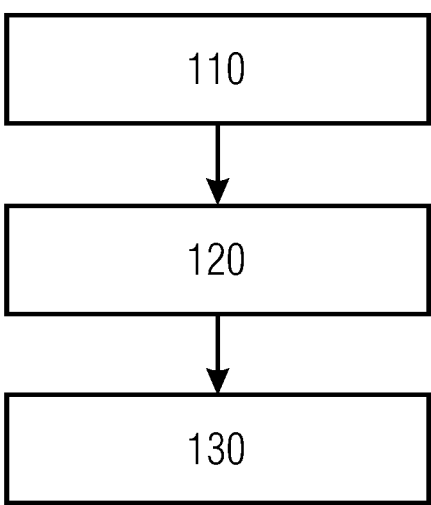
FIG. 1 is a flow chart of an example method for an industrial device incorporating teachings of the present disclosure.

Some embodiments include methods for controlling an industrial device comprising obtaining a state input characterizing a current state of the industrial device; processing the state input to generate an action output characterizing an expected action to be performed by the industrial device for the current state, based on a machine learning model that is trained based on states of the industrial device, actions each performed for each state of the industrial device and results each obtained by performing each action; and generating a control signal for the industrial device based on the action output.

In some embodiments, a device for controlling an industrial device comprises an obtaining apparatus for obtaining a state input characterizing a current state of the industrial device; a processor for processing the state input to generate an action output characterizing an expected action to be performed by the industrial device for the current state, based on a machine learning model that is trained based on states of the industrial device, actions each performed for each state of the industrial device and results each obtained by performing each action, and generating a control signal for the industrial device based on the action output; and a controller for controlling the industrial device based on the control signal.

In some embodiments, a controlling device for an industrial device comprises one or more processor; and one or more memories storing instructions that are operable, when executed the one or more processor, to cause the one or more processor to perform the method of the embodiments of the invention.

In some embodiments, a computer storage medium comprising instructions for, when executed by one or more processors, performing one or more of the methods described herein. The behavior of the device is modeled without expert design and thus cost is reduced and time effectiveness is improved. The model may be adaptively tuned to better conform to the industrial device, therefore enabling easy and cost efficient scaling. The control of the industrial device may be improved and then a better product quality and a higher production efficiency may be achieved for the industrial device.

The same reference signs in the figures indicate similar or corresponding feature and/or functionality. The teachings of the present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes.

In some embodiments, by using a machine learning model, especially a deep learning based model, which is trained, based on not only states of the industrial device and actions each performed for each state of the industrial device but also results each obtained by performing each action, to generate an expected action to be performed for a current state of the industrial device, wherein the results are used to adjust value (s) of one or more parameters of the machine learning model to reinforce the model, no separate controls are needed for different parameters and the modelling does not require manual work, thus the industrial device may be controlled with low cost and high time efficiency without high manual intervention.

Further, the machine learning model maybe updated by an interaction with a device model of the industrial device that is trained to output a following state of a state when receiving a pair of the state and an action, this may ensure that the machine learning model may be further trained and tested with high efficiency and low risk before applying it in areal industrial device, therefore further improving the adaptation of the machine learning model to the industrial device. In addition, it is possible that the device model is updated periodically and the machine learning model interacts with the updated device model to update the machine learning model periodically. This allows the machine learning model adaptive to any changes of the industrial device.

Moreover, after the machine learning model is applied to a real industrial device to control its operations, it may be further updated by the device data from the real controlling of the operations.

FIG. 1 is a flow chart of an example controlling method 100 for an industrial device incorporating teachings of the present disclosure. According to the controlling method 100, in a step 110, a state input characterizing a current state of an industrial device is received. The state input may be from any kinds of sensors associated with the industrial device and may be any kinds of data including but not limited to at least one of temperature, power, and speed. For different types of industrial devices, the state input may be different. For example, for controlling the industrial device for the production of mono-crystalline silicon material, the diameter of a mono-crystalline rod can be affected by a pull speed and a current silicon liquid temperature, therefore, the state input may be associated with the pull speed and the current silicon liquid temperature to characterize the current state of the industrial device.

In a step 120, the state input is processed based on a machine learning model, especially a deep learning-based model, to generate an action output characterizing an expected action to be performed by the industrial device for the current state. The machine learning model is especially trained by the historical data of human expert knowledge, in particular the human expert knowledge with respect to the industrial device. The human expert knowledge may represent how to control the industrial device under different conditions. The machine learning model may also be trained by the historical data of the industrial device.

The historical data of the human expert knowledge and/or of the industrial device may be processed to into learnable form, i.e., including states of the industrial device, actions each performed for each state of the industrial device and results each obtained by performing each action. Then the machine learning model can be trained by the obtained states, actions and results. The machine learning model is a reinforcement learning model in which the results are used to adjust the value (s) of one or more parameters of the model.

The expected action refers to any kinds of actions to be adopted for the current state. For example, for the production of mono-crystalline silicon material, if it is found that the diameter of a mono-crystalline rod deviates from a normal value, the silicon liquid temperature is adjusted with a predetermined value. The result refers to what is obtained after performing one action for a state, such as how much one parameter of the industrial device is improved.

After generating the action output in the step 120, in a step 130, a control signal can be generated for the industrial device based on the action output, thereby the industrial device maybe controlled to perform the expected action. In one embodiment, before generating the control signal, a risk of the expected action may be evaluated to determine if the expected action can be safely performed by the industrial device, the evaluation may be performed based on a set of predetermined risk check rules. If the risk is higher than expected, the control signal will not be generated based on the expected action; otherwise, the control signal will be generated based on the expected action and the expected action will be performed.

Although above the method 100 is described with respect to the use of the machine learning model, it is also possible that the method 100 includes a step of training the model before the step 110. The training can be based on the states of the industrial device, the actions each performed for each state of the industrial device and the results each obtained by performing each action.

In some embodiments, the machine learning model may be trained via off-policy learning. According to the off-policy learning, the historical data is processed to generate one or more "state-action-result" triplets with which the machine learning model is trained and/or updated until a predetermined ending condition (e.g., a number of the triplets or the performance) is met.

In some embodiments, the machine learning model may be trained via on-policy learning. According to the on-policy learning, a value prediction model and a policy model are trained separately and then used to generate the machine learning model.

In some embodiments, the historical data is processed to generate one or more "state-action-result" triplets as well as one or more "state-action" pairs, the value prediction model is trained and/or updated based on the one or more "state-action-result" triplets while the policy model is trained and/or updated based on the one or more "state-action" pairs until predetermined endling conditions for both the value prediction model and the policy model are met. After the predetermined endling conditions are met, the machine learning model is generated based on the value prediction model and the policy model.

In some embodiments, the machine learning model can be updated by an interaction with a device model that is trained to generate a next state corresponding to a pair of a state and an action.

Figure 2:
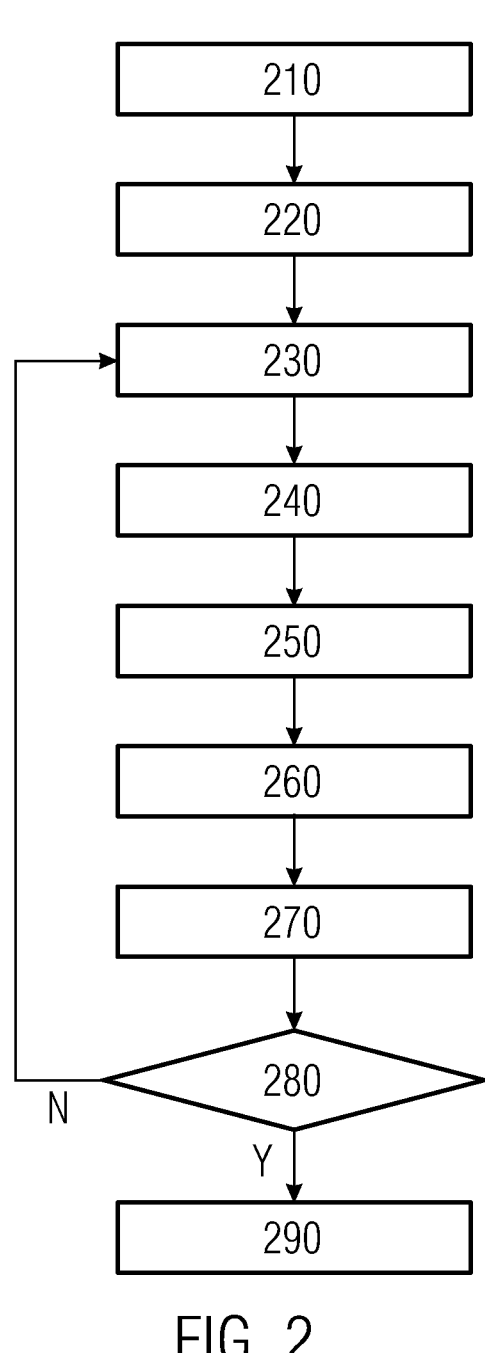
FIG. 2 is a flow chart of an example method 200 for updating and/or testing the machine learning model by interacting with the device model incorporating teachings of the present disclosure.

FIG. 2 is a flow chart of an example method 200 for updating and/or testing the machine learning model by interacting with the device model incorporating teachings of the present disclosure. According to the method 200, in a step 210, historical data of the industrial device is obtained for updating and/or testing the machine learning model. The historical data can be different from that used to train the machine learning model as described above.

In a step 220, the historical data is processed to obtain a set of states of the industrial device as further states for updating and testing the trained machine learning model.

In a step 230, a further state is obtained from the set of states of the industrial device and in a step 240 the further state is processed based on the machine learning model to generate a further action to be performed by the industrial device for the further state, thereby obtaining a pair of the further state and the further action.

In a step 250, the pair of the further state and the further action are processed to generate a state next to the further state based on a device model that is trained, based on each pair of state and action of the industrial device and a next state corresponding to the pair, to generate a next state corresponding to a pair of state and action. The device model maybe a manually constructed simulation model or a data driven supervised learning model. For the data driven supervised learning model, the device model may be updated periodically with the data from the industrial device. The updated device model may accurately reflect the property of the industrial device that can be changed over time. Interacting with such device model, the machine learning model may be updated and tested more accurately, thereby ensuring the quality of the obtained machine learning model.

In a step 260, a result of the further action may be computed based on the further state and the state next to the further state.

In a step 270, the machine learning model may be updated, or further trained, based on the further state, the further action and the state next to the further state.

In a step 280, it is determined whether a predetermined ending condition is met, for example, whether the number of the states exceeds a predetermined value. If it is determined that predetermined ending condition is not met the method 200 returns to the step 230 to obtain another further state. If it is determined that predetermined ending condition is met, the method 200 proceeds to a step 290 to output a new machine learning model.

The method 200 is described as above with reference to updating the machine learning model by interacting with the device model, it can be conceived to test the machine learning model by interacting with the device model also. For testing the machine learning model, in one embodiment, after computing the result corresponding to the further action in the step 260, the computed result may be compared to the actual result that can be obtained from the historical data for the further state, therefore, the machine learning model may be tested with the device model before being applied to the real industrial device.

In some embodiments, the method 200 can be performed before applying the machine learning model to a real industrial device to make sure that the machine learning model has an enough high quality to be applied in the real industrial device.

In some embodiments, the method 200 can be performed to update the machine learning model periodically after the machine learning model is applied in the real industrial device, to make sure that the machine learning model conforms to any change of the industrial device.

Figure 3:
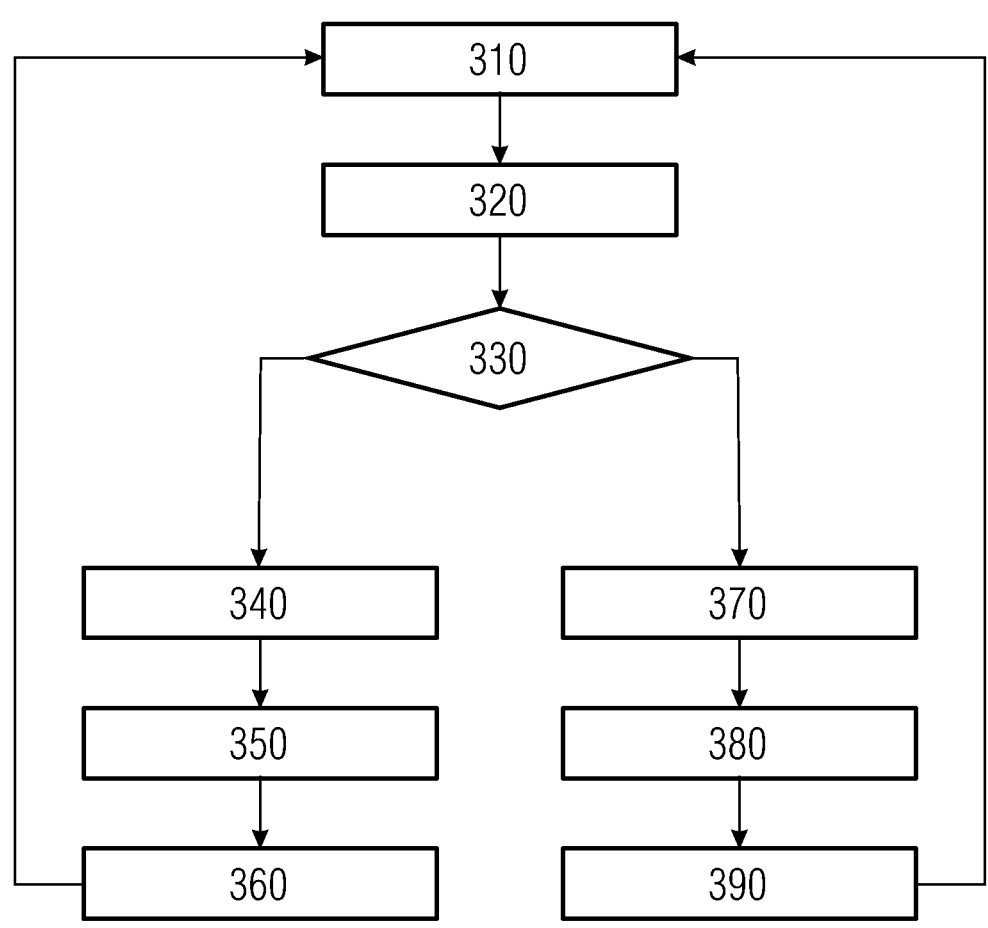
FIG. 3 is a flow chart of an example method 300 for updating the machine learning model when it is used in the industrial device incorporating teachings of the present disclosure.

In some embodiments, the machine learning model can be updated while it is used in the real industrial device. FIG. 3 is a flow chart of a method 300 for updating the machine learning model when it is used in the industrial device incorporating teachings of the present disclosure.

According to the method 300, in a step 310, similar to above step 110, a state input characterizing a current state of an industrial device is received. In a step 320, similar to above step 120, the state input is processed based on the machine learning model to generate an action output characterizing an expected action to be performed by the industrial device for the current state.

In a step 330, it is determined whether the expected action can be safely performed by the industrial device based on a predetermined set of risk check rules. If it is determined in the step 330 that the expected action can be safely performed, in a step 340, a control signal is generated for the industrial device to perform the expected action. After that, in a step 350, the result corresponding to the expected action can be observed from the industrial device, and in a step 360, the machine learning model can be updated based on the current state, the expected action and the result corresponding to the expected action.

If it is determined in the step 330 that the expected action cannot be safely performed, in a step 370, the machine learning model can be trained based on the current state, the expected action and a predetermined result for the current state and the expected action. Or the training step 370 can be omitted. After that, a backup action may be obtained by a predetermined backup action determining method in a step 380 and a control signal maybe generated based on the backup action in a step 390.

The updating manners of the machine learning model have been described with reference to FIG. 2 and FIG. 3, it is contemplated that the updating manners can be combined or separately used.

In some embodiments, the machine learning model can be real time updated while it is used in the real industrial device and periodically updated by interaction with the device model.

Figure 4:
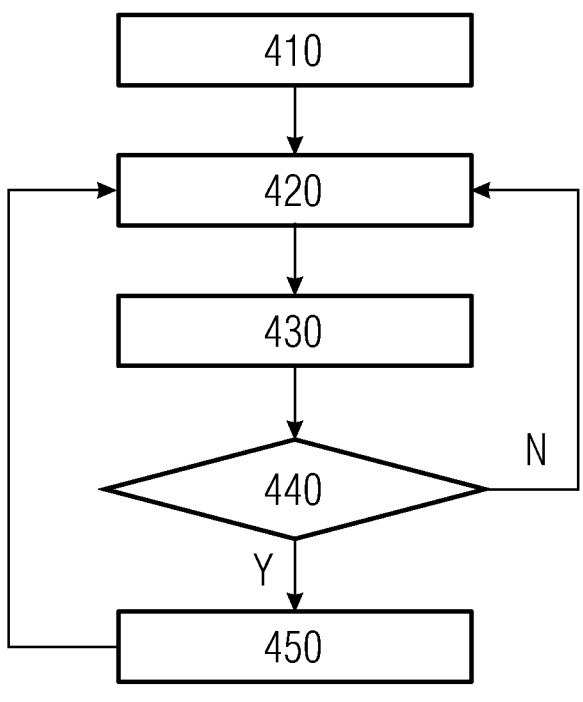
FIG. 4 is a flow chart of an example method 400 for updating the machine learning model after it is used for the real industrial device incorporating teachings of the present disclosure.

FIG. 4 is a flow chart of an example method 400 for updating the machine learning model after it is used for the real industrial device incorporating teachings of the present disclosure. According to the method 400, in a step 410, the machine learning model is applied to the real industrial device. In a step 420, a process is performed based on the machine learning model and the operating data of the industrial device may be obtained and stored. In a step 430, the machine learning model maybe updated. The updating can be performed real time with reference to the method 300 of FIG. 3.

In a step 440, it is determined whether a periodical update is needed, for example, whether a time period (e.g., a month) is expired. If it is determined that the periodical update is needed, the method 400 proceeds to a step 450 in which the machine learning model may be updated by interacting with the device model with reference to the method 200 of FIG. 2 based on the stored operating data of the industrial device. Otherwise, if it is determined that the periodical update is not needed, the method 400 continues to the step 420.

It is contemplated that the device model can be updated also. In particular, one or more pairs of state and action as well as one or more next states each corresponding to one of the one or more pairs of state and action are obtained from the operating data of the industrial device; and the device model can be updated based on the obtained one or more pairs of state and action and the obtained one or more next states.

Although the teachings of the present disclosure is described with reference to different flow charts, it may be contemplated that any of them may be combined to achieve different functions. In addition, the different steps of above flow charts may be combined, altered, deleted and replaced in different embodiments for achieving different functions.

Figure 5:
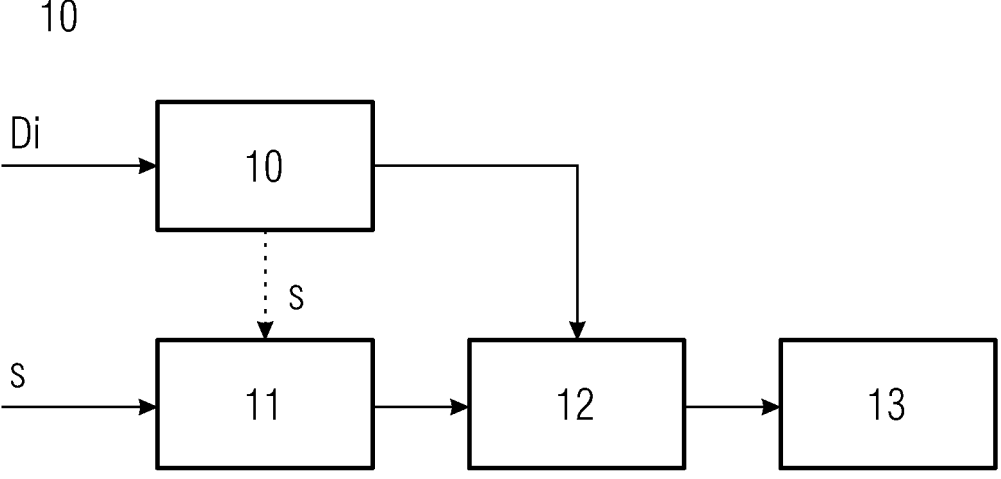
FIG. 5 is a block diagram of an example device for controlling an industrial device incorporating teachings of the present disclosure.

FIG. 5 is a block diagram of a device 10 for controlling an industrial device incorporating teachings of the present disclosure. The device 10 at least includes an obtaining apparatus 11, a processor 12 and a controller 13. The obtaining apparatus 11 is used for obtaining a state input S characterizing a current state of the industrial device. The processor 12 processes the state input to generate an action output characterizing an expected action to be performed by the industrial device for the current state, based on a machine learning model that is trained based on states of the industrial device, actions each performed for each state of the industrial device and results each obtained by performing each action, and generates a control signal for the industrial device based on the action output. The controller 13 controls the industrial device based on the control signal. In one embodiment, the control signal includes the value(s) of the controlling settings of the industrial device.

In some embodiments, the device 10 further comprises a text identifying and extracting apparatus 14. In one aspect, it can receive the historical data/operating data Di of the industrial device, or the expert knowledge of the industrial device with respect to how to control the industrial device indifferent conditions, and identify and extract one or more "state-action-result" triplets from the received data to use in training and/or updating the machine learning model. In another aspect, it can receive operating data from the industrial device or a user in real time to identify the state input indicating the current state of the industrial device.

In some embodiments, the processor 12 updates the machine learning model by obtaining a further state of the industrial device; processing the further state of the industrial device to generate a further action to be performed by the industrial device for the further state, based on the machine learning model; generating a state next to the further state based on the further state and the further action based on a device model that is trained based on each pair of state and action of the industrial device and a next state corresponding to the pair of the state and the action; computing a result of the further action based on the further state and the state next to the further state; and updating the machine learning model based on the further state, the further action and the result of the further action.

Wherein the device model can be updatable, in particular, the processor 12 updates the device model by obtaining one or more pairs of state and action from historical data of the industrial device; obtaining one or more next states each corresponding to one of the one or more pairs of state and action from the historical data of the industrial device; and updating the device model based on the obtained one or more pairs of state and action and the obtained one or more next states.

In some embodiments, the processor 12 updates the machine learning model in real time when it is used in the industrial device. In particular, the processor 12 determines if the expected action can be safely performed by the industrial device; in response to a determination that the expected action can be safely performed, generates the control signal for the industrial device to perform the expected action, obtaining the result corresponding to the expected action, and updates the machine learning model based on the current state, the expected action and the result corresponding to the expected action; and in response to a determination that the expected action cannot be safely performed, updates the machine learning model based on the current state, the expected action and a predetermined result for the current state and the expected action.

The states and actions used during the updating may be identified and extracted via the text identifying and extracting apparatus 14.

Example

For the production of mono-crystalline rod, a manual input of heating power setting is generally required. By using the methods of the embodiments of the present invention, we trained and updated a machine learning model to predict an action to adopted for a current state.

Figure 6:
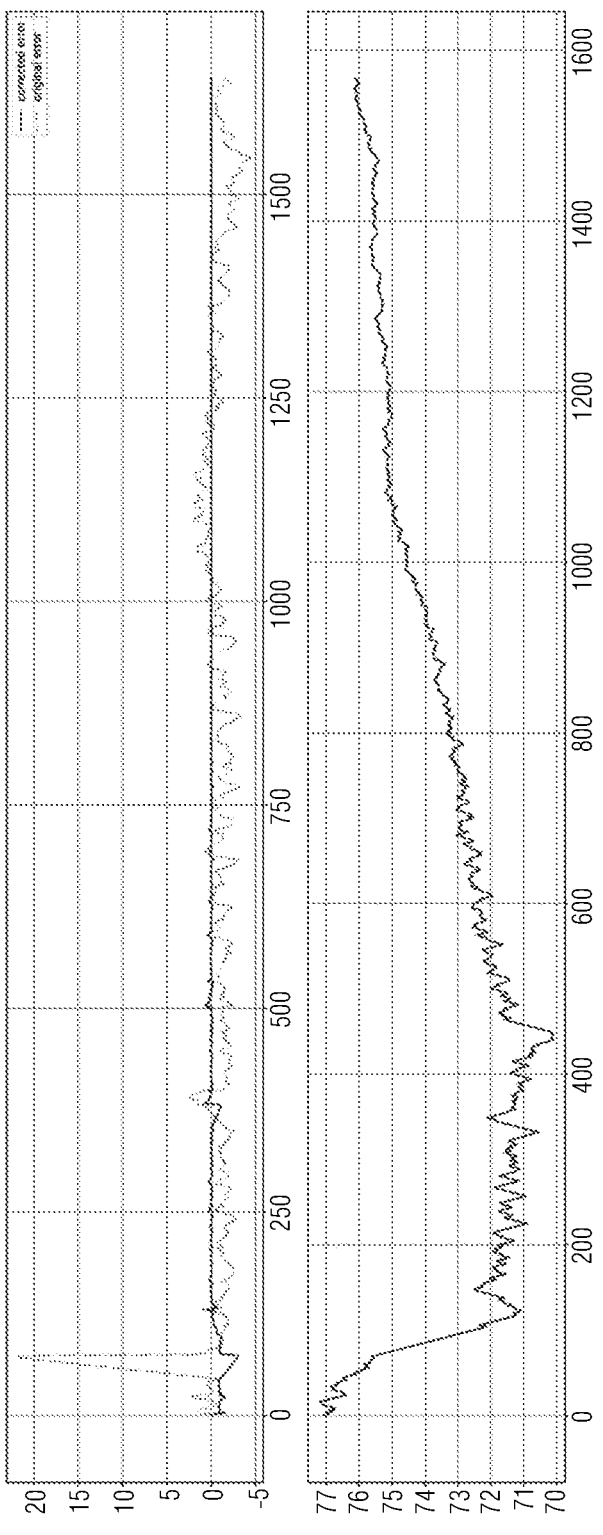
FIG. 6 shows a result of using the methods of the embodiments for the production of mono-crystalline rod.

FIG. 6 shows a result of using the methods as described herein for the production of mono-crystalline rod. The left part shows an optimized heating power curve. The right part shows an comparison between original control error and optimized error, wherein the solid line represents the error obtained by the teachings of the present disclosure while the dotted line represents the error obtained by an original controlling method. It is obvious that the error is improved notably.

The embodiments described above may be performed by digital electronic circuitry, in computer software or firmware, in computer hardware, and any combination thereof. In some embodiments, the controlling device for the industrial device may be achieved by one or more memories and one or more processors. The memories storing instructions that are operable, when executed the one or more processor, to cause the one or more processor to perform one or more of the methods described herein.

The methods described herein may be performed by a computer storage medium. The storage medium soring instructions for, when executed by one or more processors, performing the methods of embodiments. The methods described herein may also be performed at a remote location relative to the industrial device, e.g., at a cloud.

The above-mentioned embodiments illustrate rather than limit the scope of the disclosure and that those skilled in the art would be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the product claims enumerating several units, several of these units can be embodied by one and the same item of software and/or hardware. The usage of the words first, second and third, et cetera, does not indicate any ordering. These words are to be interpreted as names.

What is claimed is:

1. A method for controlling an industrial device, the method comprising:

obtaining a state input characterizing a current state of the industrial device;

processing the state input to generate an action output characterizing an expected action to be performed by the industrial device for the current state, based on a machine learning model trained based on states of the industrial device, respective actions performed for each state of the industrial device, and results respective obtained by performing each action;

generating a control signal for the industrial device based on the action output; and updating the machine learning model by:

obtaining a further state of the industrial device;

processing the further state of the industrial device to generate a further action to be performed by the industrial device for the further state, based on the machine learning model;

generating a state next to the further state based on the further state and the further action based on a device model that is trained based on (a) one or more state-action pairs, each comprising a respective state of the industrial device and a corresponding action performed for the respective state and (b) one or more next states each corresponding to a respective state-action pair;

computing a result of the further action based on the further state and the state next to the further state; and updating the machine learning model based on the further state, the further action, and the result of the further action.

2. The method of claim 1, the method further comprising deriving the states, the actions, and the results of the industrial device from historical data of the industrial device and/or human expert knowledge.

3. The method of claim 2, further comprising training the machine learning model via on-policy learning or off-policy learning.

4. The method claim 2, further comprising generating the machine learning model by training the machine learning model based on the states of the industrial device, the actions each performed for each state of the industrial device and the results each obtained by performing each action.

5. The method of claim 1, wherein updating the device model includes:

obtaining one or more pairs of state and action from historical data of the industrial device;

obtaining one or more next states each corresponding to one of the one or more pairs of state and action from the historical data of the industrial device; and updating the device model based on the obtained one or more pairs of state and action and the obtained one or more next states.

6. The method of claim 1, further comprising:

determining if the expected action can be safely performed by the industrial device; and in response to a determination that the expected action can be safely performed, generating the control signal for the industrial device to perform the expected action, obtaining the result corresponding to the expected action, and updating the machine learning model based on the current state, the expected action and the result corresponding to the expected action.

7. The method of claim 6, the method further comprising in response to a determination that the expected action cannot be safely performed, updating the machine learning model based on the current state, the expected action and a predetermined result for the current state and the expected action.

8. A device for controlling an industrial device, the device comprising:

an obtaining apparatus for obtaining a state input characterizing a current state of the industrial device;

a processor for processing the state input to generate an action output characterizing an expected action to be performed by the industrial device for the current state, based on a machine learning model that is trained based on states of the industrial device, actions each performed for each state of the industrial device and results each obtained by performing each action, and generating a control signal for the industrial device based on the action output; and a controller for controlling the industrial device based on the control signal; and wherein the processor is further programmed to update the machine learning model by:

obtaining a further state of the industrial device;

processing the further state of the industrial device to generate a further action to be performed by the industrial device for the further state, based on the machine learning model;

generating a state next to the further state based on the further state and the further action based on a device model that is trained based on (a) one or more state-action pairs, each comprising a respective state of the industrial device and a corresponding action performed for the respective state and (b) one or more next states each corresponding to a respective state-action pair;

computing a result of the further action based on the further state and the state next to the further state; and updating the machine learning model based on the further state, the further action, and the result of the further action.

9. The device of claim 8, wherein the processor is further programmed to update the device model by:

obtaining one or more pairs of state and action from historical data of the industrial device;

obtaining one or more next states each corresponding to one of the one or more pairs of state and action from the historical data of the industrial device; and updating the device model based on the obtained one or more pairs of state and action and the obtained one or more next states.

10. The device of claim 8, wherein the processor is further programmed to:

determine if the expected action can be safely performed by the industrial device; and in response to a determination that the expected action can be safely performed, generate the control signal for the industrial device to perform the expected action, obtain the result corresponding to the expected action, and update the machine learning model based on the current state, the expected action and the result corresponding to the expected action.

11. The device of claim 10, wherein the processor is further programmed to, in response to a determination that the expected action cannot be safely performed, updating the machine learning model based on the current state, the expected action and a predetermined result for the current state and the expected action.

12. A controlling device for an industrial device, the controlling device comprising:

one or more processor; and one or more memories storing instructions operable, when executed the one or more processor, to cause the one or more processor to:

obtain a state input characterizing a current state of the industrial device;

process the state input to generate an action output characterizing an expected action to be performed by the industrial device for the current state, based on a machine learning model trained based on states of the industrial device, actions each performed for each state of the industrial device and results each obtained by performing each action;

generate a control signal for the industrial device based on the action output; and update the machine learning model by:

obtaining a further state of the industrial device;

processing the further state of the industrial device to generate a further action to be performed by the industrial device for the further state, based on the machine learning model;

generating a state next to the further state based on the further state and the further action based on a device model that is trained based on (a) one or more state-action pairs, each comprising a respective state of the industrial device and a corresponding action performed for the respective state and (b) one or more next states each corresponding to a respective state-action pair;

computing a result of the further action based on the further state and the state next to the further state; and updating the machine learning model based on the further state, the further action, and the result of the further action.

\* \* \* \* \*